United States Patent
Juan et al.

(10) Patent No.: US 10,013,019 B2
(45) Date of Patent: Jul. 3, 2018

(54) ALL-IN-ONE COMPUTER APPARATUS

(71) Applicant: Young Lighting Technology Inc., Hsin-Chu (TW)

(72) Inventors: Chen-Tsun Juan, Hsin-Chu (TW); Li-Wen Chang, Hsin-Chu (TW); Wen-Chih Tang, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days.

(21) Appl. No.: 15/441,256

(22) Filed: Feb. 24, 2017

(65) Prior Publication Data
US 2017/0262013 A1 Sep. 14, 2017

(30) Foreign Application Priority Data
Mar. 8, 2016 (TW) ................................ 105203110

(51) Int. Cl.
*G06F 1/16* (2006.01)
*G06F 1/18* (2006.01)

(52) U.S. Cl.
CPC ............ *G06F 1/1601* (2013.01); *G06F 1/182* (2013.01); *G06F 2200/1612* (2013.01); *G06F 2200/1631* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,537,289 | A | * | 7/1996 | Dahl | A61M 5/1413 312/209 |
| RE38,349 | E | * | 12/2003 | Stonebraker | G02F 1/133308 248/918 |
| 6,757,551 | B2 | * | 6/2004 | Newman | G06F 1/1601 361/679.21 |
| 7,092,248 | B2 | * | 8/2006 | Shu | G06F 1/1601 312/223.1 |
| 7,145,767 | B2 | * | 12/2006 | Mache | F16M 11/046 361/679.21 |
| 7,200,702 | B2 | * | 4/2007 | Keely | G06F 1/1626 361/679.21 |
| 7,848,090 | B2 | * | 12/2010 | Ikeda | G06F 1/1601 361/679.21 |
| 8,164,888 | B2 | * | 4/2012 | Ma | G06F 1/1601 312/249.9 |

(Continued)

FOREIGN PATENT DOCUMENTS

CN 1580882 2/2005
TW 444904 7/2001

(Continued)

*Primary Examiner* — Lisa Lea Edmonds
(74) *Attorney, Agent, or Firm* — JCIPRNET (57) ABSTRACT

A computer apparatus including a host unit and a display unit is provided. The host unit has a host bonding area and a host connector, and the host connector is located in the host bonding area. The display unit has a display bonding area and a display connector, and the display connector is located in the display bonding area. The display bonding area is adapted to position to the host bonding area, and the display connector is adapted to couple to the host connector. The display unit is detachably connected to the host unit.

8 Claims, 8 Drawing Sheets

(56) References Cited

U.S. PATENT DOCUMENTS

| | | | | |
|---|---|---|---|---|
| 8,191,837 B2 * | 6/2012 | Chen | ............. | G06F 1/1607 248/176.1 |
| 8,351,194 B2 * | 1/2013 | Ku | ............. | G06F 1/181 361/679.21 |
| 8,411,426 B2 * | 4/2013 | Ikeda | ............. | G06F 1/1601 361/679.21 |
| 8,537,122 B2 * | 9/2013 | Geiger | ............. | G06F 3/0414 361/679.21 |
| 8,537,532 B2 * | 9/2013 | Chen | ............. | G06F 1/181 361/679.21 |
| 8,625,265 B2 * | 1/2014 | Chen | ............. | F16M 11/046 361/679.21 |
| 8,705,228 B2 * | 4/2014 | Chuang | ............. | H05K 5/0247 361/679.21 |
| 9,042,092 B2 * | 5/2015 | Lu | ............. | F16M 11/041 361/679.21 |
| 2007/0097617 A1 * | 5/2007 | Searby | ............. | F16M 11/041 361/679.4 |
| 2009/0225504 A1 * | 9/2009 | Wu | ............. | F16M 11/10 361/679.21 |
| 2011/0054268 A1 * | 3/2011 | Fidacaro | ............. | A61B 5/0002 600/300 |
| 2011/0216493 A1 * | 9/2011 | Zheng | ............. | G06F 1/16 361/679.21 |
| 2013/0010418 A1 * | 1/2013 | Flynn | ............. | G06F 1/16 361/679.21 |
| 2013/0155595 A1 * | 6/2013 | Herring | ............. | G07G 1/0018 361/679.21 |
| 2014/0160656 A1 * | 6/2014 | Morrison | ............. | G06F 1/1626 361/679.21 |

FOREIGN PATENT DOCUMENTS

| | | |
|---|---|---|
| TW | M288748 | 3/2006 |
| TW | M414617 | 10/2011 |

* cited by examiner

ALL-IN-ONE COMPUTER APPARATUS

CROSS-REFERENCE TO RELATED APPLICATION

This application claims the priority benefit of Taiwan application serial no. 105203110, filed on Mar. 8, 2016. The entirety of the above-mentioned patent application is hereby incorporated by reference herein and made a part of this specification.

BACKGROUND OF THE INVENTION

1. Field of the Invention

The invention generally relates to a computer apparatus, and in particular, to an all-in-one (AIO) computer apparatus.

2. Description of Related Art

Computers with an AIO framework have qualities such as being convenient, small, aesthetically pleasing, and easily matched with interior furnishing. Thus, computers with an AIO framework have been rapidly developed in recent years, and have gained widespread popularity. Currently, computers with an AIO framework are applied in many fields. For example, many people use computers with an AIO framework to replace conventional desktop computers at home. In addition, computers with an AIO and touch functions are applied in many checkout counters of shops and menu systems of restaurants.

Generally, a computer with an AIO framework is fixed as a set, so the display screen of the display terminal and the printed circuit board assembly (PCBA) of the host terminal are completely fixed together. Then the set is fixed into a computer case. However, when the display screen is damaged, since the display screen and the components of the host terminal are unable to be individually replaced, the entire computer must be sent back to the factory to be fixed. When being fixed, the user is unable to continue using the computer, which is inconvenient for the user. In addition, the user may have different needs towards the display screen of the display terminal or the hardware of the host terminal. For example, the outer appearance may need to be changed or the hardware may need to be improved. At this point, the user has to upgrade or change the entire computer, and is unable to individually upgrade or change the display screen of the display terminal or the hardware of the host terminal.

The information disclosed in this "BACKGROUND OF THE INVENTION" section is only for enhancement of understanding of the background of the described technology and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention provides a computer apparatus. The computer apparatus under an all-in-one (AIO) framework has better maintenance convenience, and is easy to upgrade and customize its hardware.

Other objectives, features and advantages of the invention will be further understood from the further technological features disclosed by the embodiments of the invention wherein there are shown and described preferred embodiments of this invention, simply by way of illustration of modes best suited to carry out the invention.

In order to achieve one of, a part of, some or all of the aforementioned objects or other objects, an embodiment of the invention provides a computer apparatus. The computer apparatus includes a host unit and a display unit. The host unit has a host bonding area and a host connector, and the host connector is located in the host bonding area. The display unit has a display bonding area and a display connector, and the display connector is located in the display bonding area. The display bonding area is adapted to position to the host bonding area, and the display connector is adapted to couple to the host connector. The display unit is detachably connected to the host unit.

Based on the above, the embodiments of the invention have at least one of the following advantages or effects. In the computer apparatus of the embodiment of the invention, the display bonding area may be positioned to the host bonding area, and the display connector is coupled to the host connector. In addition, the display unit is detachably connected to the host unit. Thus, when the display unit or the host unit is damaged, the display unit or the host unit may be individually changed, so that the computer apparatus with an AIO framework may undergo maintenance conveniently. In addition, the user may individually select the display unit or the host unit to undergo an upgrade or change according to user requirements. The entire computer apparatus does not need to be changed or upgraded. Thus, the computer apparatus with an AIO framework is easy to upgrade and customize its hardware.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
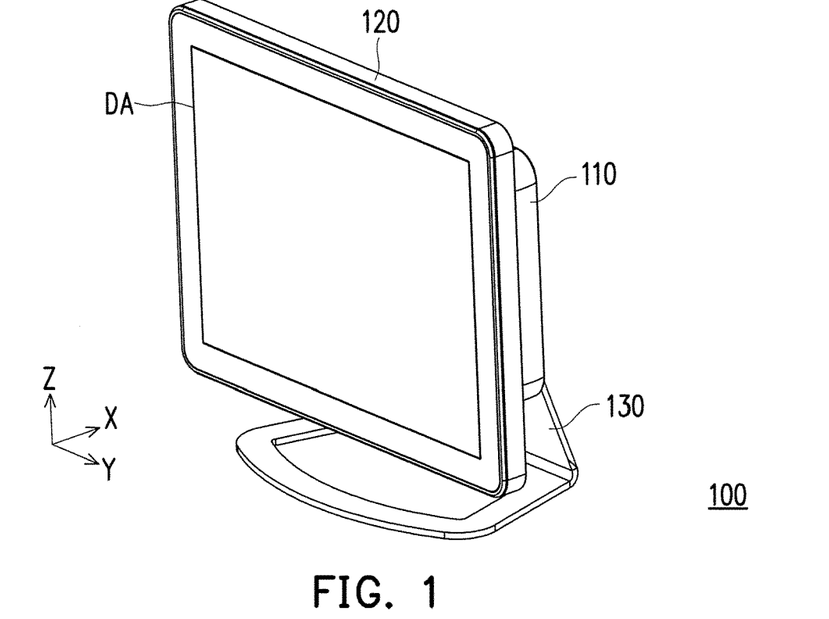
FIG. 1 is a three dimensional schematic view of a computer apparatus according to an embodiment of the invention.
Figure 2:
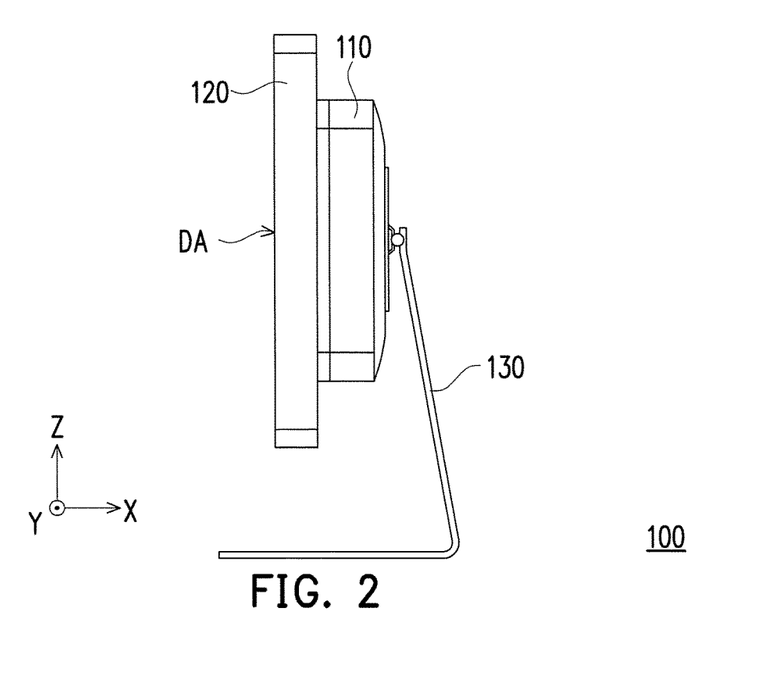
FIG. 2 is a side schematic view of the computer apparatus of the embodiment of FIG. 1.
Figure 3:
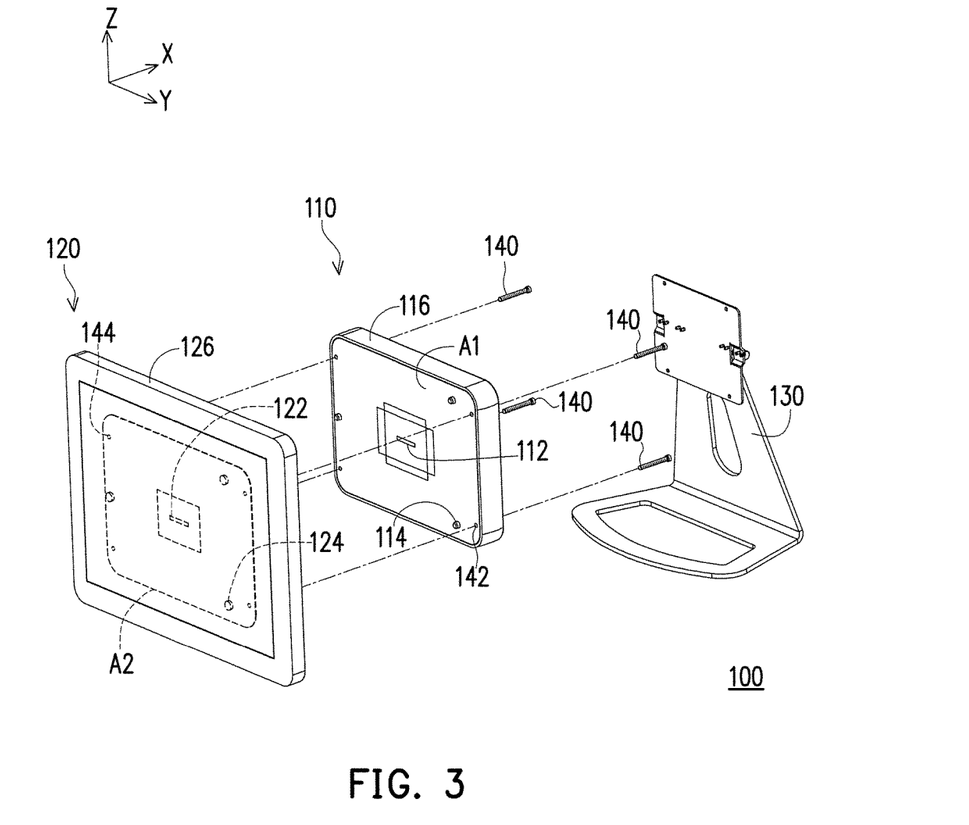
FIG. 3 is an exploded schematic view of the computer apparatus of the embodiment of FIG. 1.

FIG. 1 is a three dimensional schematic view of a computer apparatus according to an embodiment of the invention. FIG. 2 is a side schematic view of the computer apparatus of the embodiment of FIG. 1. Please refer to FIG. 1 and FIG. 2. In the embodiment, the computer apparatus 100 includes a host unit 110 and a display unit 120. The display unit 120 is connected to the host unit 110. Specifically, the computer apparatus 100 is, for example, a computer with an AIO framework. The display unit 120 is detachably connected to the host unit 110. The host unit 110 may include a processor and a memory. The related components of the host unit 110, such as the processor and the memory, are disposed in an outer casing (for example the outer casing 116 as seen in FIG. 3) of the host unit 110. In addition, the host unit 110 may have a signal terminal interface (not shown) for external signal transmission. In addition, the computer apparatus 100 of the embodiment further includes a support unit 130, the support unit 130 is connected to the host unit 110, so as to support the host unit 110 and the display unit 120 detachably connected to the host unit 110. Specifically, the support unit 130 is, for example, a support frame, for the host unit 110 and the display unit 120 to be disposed on a flat surface (for example, a table).

In the embodiment, the processor may be a hardware (for example, a chip set, processor, etc) having computing power. For example, the processor may be, for example, a central processing unit (CPU), a programmable microprocessor, a digital signal processor (DSP), a programmable controller, an application specific integrated circuit (ASIC), a programmable logic device (PLD), or other similar devices. The invention is not limited thereto. In addition, the memory is, for example, a random access memory (RAM), a read-only memory (ROM), a flash memory, or a magnetic disk storage device. The memory may be an external storage unit. The invention is not limited thereto. In some embodiments, the related components of the host unit 110, such as the processor and the memory, may be disposed on a motherboard. The functions of the related components of the host unit 110 may be achieved through a printed circuit board assembly (PCBA). The invention does not limit type or form of the related components of the host unit 110. Furthermore, the computer apparatus 100 is not limited to a computer apparatus with an AIO framework. The computer apparatus 100 may also be other types of computers.

In the embodiment, the display unit 120 has a display image area DA. The display image area DA is disposed on a side of the display unit 120 facing away from the host unit 110. The display unit 120 is, for example, a liquid crystal display (LCD), a plasma display, an OLED display, an electrowetting display (EWD), an electro-phoretic display (EPD), an electrochromic display (ECD), or any other suitable display devices. The invention is not limited thereto. Specifically, in the embodiment, the computer apparatus 100 is, for example, located in a space made up of a first axis X, a second axis Y, and a third axis Z. A direction that the display unit 120 and the host unit 110 are sequentially arranged is parallel to the direction of the first axis X. In addition, the display image area DA of the display unit 120 is located on a plane formed by the second axis Y and the third axis Z. The first axis X, the second axis Y, and the third axis Z are perpendicular to each other.

FIG. 3 is an exploded schematic view of the computer apparatus of the embodiment of FIG. 1. Please refer to FIG. 3. In the embodiment, the host unit 110 has a host bonding area A1 and a host connector 112. The host connector 112 is located in the host bonding area A1. In addition, the display unit 120 has a display bonding area A2 and a display connector 122. The display connector 122 is located in the display bonding area A2. Specifically, the host connector 112 and the display connector 122 are, for example, a pair of slot connectors that may be connected to each other. In addition, the display image area DA of the display unit 120 faces away from the display bonding area A2. The display image area DA is parallel to the display bonding area A2. In the embodiment, the computer apparatus 100 further includes an outer casing 116. The inner components of the host unit 110 are disposed in the outer casing 116. The surface on the side of the outer casing 116 facing the display unit 120 is the host bonding area A1. The host connector 112 is located in the host bonding area A1. In addition, the computer apparatus 100 further includes an outer casing 126. The display unit 120 is disposed in the outer casing 126. The side of the outer casing 126 facing the host unit 110 has the display bonding area A2, and the display connector 122 is located in the display bonding area A2. In the embodiment, the display bonding area A2 is adapted to position to the host bonding area A1, and the display connector 122 is adapted to couple to the host connector 112. In addition, the host connector 112 is electrically connected to the inner components of the host unit 110, such as the processor or the memory. Thus, not only is the display unit 120 detachably connected to the host unit 110, when the display unit 120 is connected to the host unit 110, the computer apparatus 100 may electrically connect the host unit 110 and the display unit 120 through the connection between the host connector 112 and the display connector 122. The display image area DA of the display unit 120 may display images corresponding to the input signals of the host unit 110.

Figure 4:
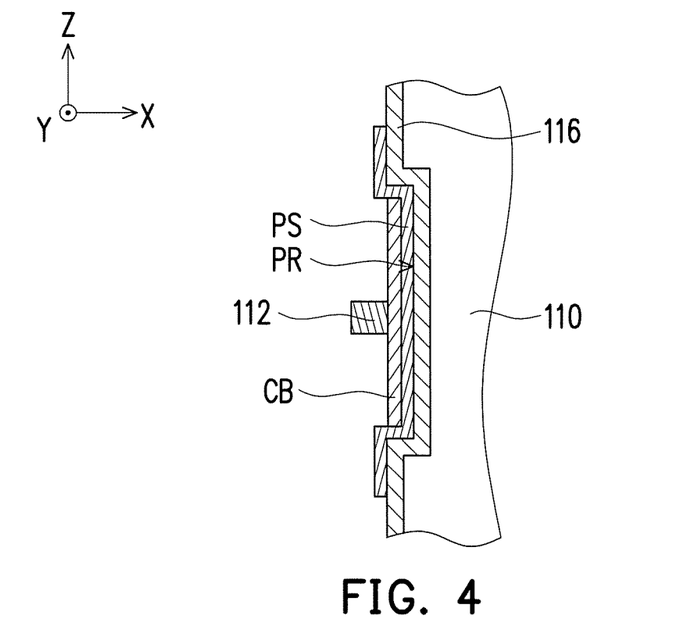
FIG. 4 is a partial cross-sectional schematic view of a host unit of the embodiment of FIG. 1.

FIG. 4 is a partial cross-sectional schematic view of a host unit of the embodiment of FIG. 1. Please refer to FIG. 3 and FIG. 4. In the embodiment, the host unit 110 has a position frame PS and a position concave portion PR. The host connector 112 is disposed on the position frame PS. The position concave portion PR is disposed on the outer casing 116 of the host unit 110, and the position concave portion PR is disposed on a side of the outer casing 116 facing the display unit 120. Specifically, the position concave portion PR is disposed on the host bonding area A1, and the position frame PS is disposed in the middle of the position concave portion PR. The position frame PS has a concave, and the shape of the concave corresponds to the shape of the position concave portion PR. The host connector 112 is fixed to the circuit board CB at the concave of the position frame PS, and the host connector 112 is electrically connected to the inner components of the host unit 110 through the circuit board CB. For example, in some embodiments, the position frame PS has an opening, and the host connector 112 is electrically connected to the inner components of the host unit 110 through the wires disposed in the opening. Or, the host connector 112 may be electrically connected to the inner components of the host unit 110 through wires bypassing around the position frame PS. In the embodiment, the position frame PS is, for example, a metal plate or other suitable metal elements, the invention is not limited thereto. In addition, in other embodiments, the host connector 112 is pivotally connected to the host unit 110 directly, and to make an angle of the host connector 112 relative to the host unit 110 change. The invention is not limited thereto.

In addition, in other embodiments, the display unit 120 may have a position frame and a position concave portion, and the display connector 122 is disposed on the position frame. The position concave portion is disposed on the outer casing 126 of the host unit 120, and the position concave portion is disposed on a side of the outer casing 126 facing the host unit 110. Specifically, the position concave portion is disposed on the display bonding area A2. In the embodiments, the position frame and the position concave portion are similar to the position frame PS and the position concave portion PR of FIG. 3 and FIG. 4, and the display connector 122 of the embodiments is electrically connected to the display unit 120 similar to the host connector 112 in FIG. 3 and FIG. 4. In addition, in other embodiments, the display connector 122 is pivotally connected to the display unit 120 directly, and to make an angle of the display connector 122 relative to the display unit 120 change. The invention is not limited thereto.

Figure 5:
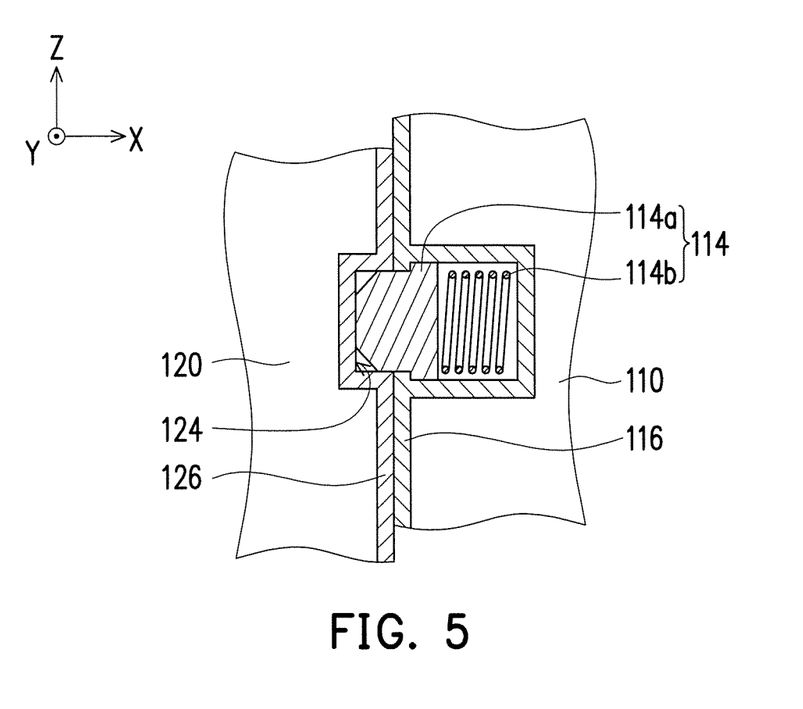
FIG. 5 is a partial cross-sectional schematic view of the computer apparatus of the embodiment of FIG. 1.

FIG. 5 is a partial cross-sectional schematic view of the computer apparatus of the embodiment of FIG. 1. Please refer to FIG. 3 and FIG. 5. In the embodiment, the host unit 110 has at least one host guide portion 114, the display unit 120 has at least one display guide portion 124, and the at least one display guide portion 124 corresponds to the at least one host guide portion 114. Specifically, the host unit 110 has a plurality of host guide portions 114, for example three host guide portions 114. The display unit 120 has a plurality of display guide portions 124, for example three display guide portions 124. The host guide portions 114 and the display guide portions 124 correspond to each other, so that the display bonding area A2 may be positioned to the host bonding area A1, and the display connector 122 is connected to the host connector 112. That is to say, when the user connects the host unit 110 and the display unit 120, the host guide portions 114 and the display guide portions 124 may guide the user to move the host unit 110 and the display unit 120 to a suitable position. This way, the display bonding area A2 may be positioned to the host bonding area A1, and the display connector 122 may be connected to the host connector 112.

Referring to FIG. 5, in the embodiment, the host guide portion 114 includes a guide pillar 114a and an elastic element 114b. The display guide portion 124 is, for example, a guide opening. Specifically, the guide pillar 114a and the elastic element 114b are disposed on the outer casing 116. The elastic element 114b is disposed between the guide pillar 114a and the host unit 110. When the guide pillar 114a is not located at the corresponding position relative to the display guide portion 124, the guide pillar 114a is blocked by the outer casing 126 to compress the elastic element 114b. At this point, the guide pillar 114a and the compressed elastic element 114b are both located in the space that the elastic element 114b was in prior to be compressed. This way, the guide pillar 114a does not protrude out the surface of the outer casing 116 facing the display unit 120. In addition, when the guide pillar 114a is located at the corresponding position relative to the display guide portion 124, the guide pillar 114a is pushed by the elastic element 114b to enter the display guide portion 124 and restrict the movement, for example, movement along the direction of the second axis Y and the third axis Z, of the outer casing 116 on the surface of the display unit 120. In the embodiment, when the guide portions 114a of the host unit 110 have all respectively entered the display guide portions 124 of the display unit 120, the guide pillars 114a restrict the movement and rotation of the outer casing 116 on the surface of the display unit 120. For example, the movement along the directions of the second axis Y and the third axis Z, and the rotation on the direction of the first axis X are limited. At this point, the host unit 110 and the display unit 120 are both in suitable positions, and the display bonding area A2 is positioned to the host bonding area A1, and the display connector 122 is connected to the host connector 112. In other embodiments, the host guide portions 114 and the display guide portions 124 also may be other types of guide components, the invention is not limited thereto.

Furthermore, in the embodiment, the display bonding area A2 may be slightly recessed. When the user attempts to connect the host unit 110 and the display unit 120, the slightly recessed display bonding area A2 may guide the user to position the display bonding area A2 to the host bonding area A1 faster. In other embodiments, the computer apparatus 100 may also have other positioning mechanisms, to assist in positioning the display bonding area A2 to the host bonding area A1, the invention is not limited thereto.

Referring to FIG. 3, in the embodiment, the computer apparatus 100 further includes at least one locking element 140. When the display bonding area A2 is positioned to the host bonding area A1 and the display connector 122 is coupled to the host connector 112, the locking unit 140 is adapted to lock the host unit 110 to the display unit 120. Specifically, the computer apparatus 100 for example, includes a plurality of locking elements 140. The locking elements 140 are, for example, a plurality of screws. Each of the screws (locking elements 140) penetrates a screw hole 142 located in the outer casing 116 and a screw hole 144 located in the outer casing 126, so that the host unit 110 is locked to the display unit 120. However, the invention does not limit the actual locking method of the locking element 140. In the embodiment, the user connects the host unit 110 and the display unit 120, and after the display connector 122 is connected to the host connector 112, the locking elements 140 are then used to lock the host unit 110 to the display unit 120.

In the embodiment, the display bonding area A2 may be positioned to the host bonding area A1 and the display connector 122 is connected to the host connector 112. In addition, the display unit 120 is detachably connected to the host unit 110. Thus, when the display unit 120 or the host unit 110 is damaged, the display unit 120 or the host unit 110 may be individually removed or replaced. For example, when the computer apparatus 100 malfunctions and the maintenance person (or user) does not know if the host unit 110 or the display unit 120 has malfunctioned, the maintenance person (or user) may separate the host unit 110 from e display unit 120. Then each may be respectively inspected, to quickly determine whether the host unit 110 or the display unit 120 has malfunctioned. In addition, the maintenance person (or user) may individually remove the display unit 120 or the host unit 110, and replace it with a spare, so that when a malfunction occurs, the entire computer apparatus 100 does not have to be returned to the factory maintenance. At the same time, the malfunctioned and removed display unit 120 or host unit 110 may perform further processes such as being inspected more in depth, fixed, or scrapped. Thus, the maintenance person (or user) may individually replace the malfunctioned display unit 120 or the malfunctioned host unit 110, so that the user may continue using the computer apparatus 100. This way, the computer apparatus 100 with an AIO framework is more convenient when undergoing maintenance.

Figure 6:
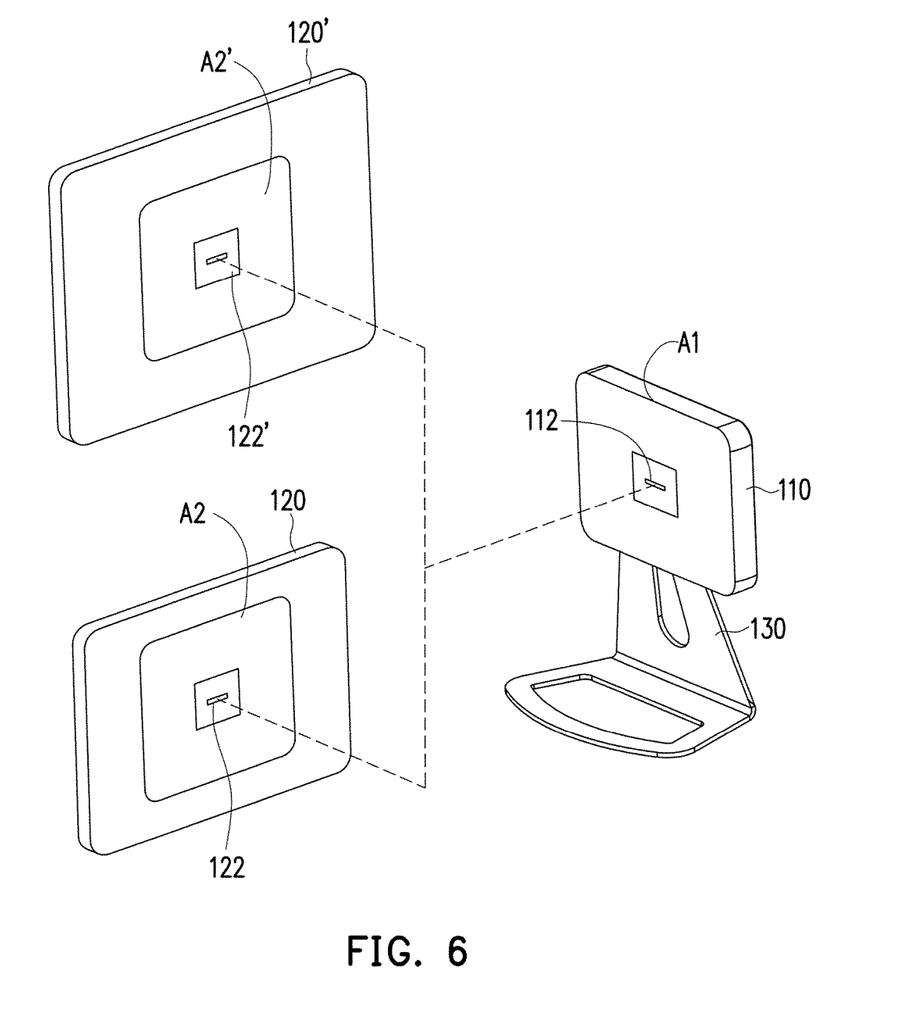
FIG. 6 is a schematic view of the display unit of the computer apparatus of the embodiment of FIG. 1 being individually changed.

FIG. 6 is a schematic view of the display unit of the computer apparatus of the embodiment of FIG. 1 being individually changed. Please refer to FIG. 6. In the embodiment, when the user has different requirements for the display unit or the hardware of the host unit, the user may individually replace or upgrade one of the display unit 120 or the host unit 110. The entire computer apparatus 100 does not need to be changed or upgraded. For example, when the user wants to use a display unit 120' with bigger dimensions to replace the display unit 120 with smaller dimensions, the user may individually remove the display unit 120 originally connected to the host unit 110. Then, the user may position the display bonding area A2' of the display unit 120' to the host bonding area A1, and the display connector 122' of the display unit 120' is connected to the host connector 112. This way, the display unit 120' is connected to the host unit 110. Similarly, when the user wants to replace the original host unit 110 with another host unit having better specifications, or the user wants to replace the original display unit 120 with another display unit having better specifications, the user may use a similar method to individually upgrade and replace one of the display unit 120 or the host unit 110. Thus, the computer apparatus 100 with an AIO framework is easy to upgrade and customize its hardware.

FIG. 7A to FIG. 7G are schematic views of a process of changing an angle of the display unit relative to the host unit according to another embodiment of the invention. Please refer to FIG. 7A to FIG. 7G. In the embodiment, the shapes of the host bonding area A1 and the display bonding area A2 are regular polygons with an even number of sides, such as four sides. In addition, the shape of the position concave portion PR corresponds to the shape of the host bonding area A1. The shape of the concave of the position frame PS corresponds to the shape of the position concave portion PR. In the embodiment, the shape of the position concave portion PR and the shape of the position frame PS are, for example, regular polygons with four sides. The position frame PS is matched the position concave portion PR to be in a first position or a second position. This way, an angle of the host connector 112 relative to the host unit 110 is changed from a first angle corresponding to the first position to a second angle corresponding to the second position. It should be noted that, in some embodiments, the shape of the host bonding area A1 may be designed according to the shape of the outer casing 116, with suitable trimming, chamfering, or filleting. At the same time, the shape of the display bonding area A2 corresponds to the shape of the host bonding area A1. The invention is not limited thereto.

Figure 7A:
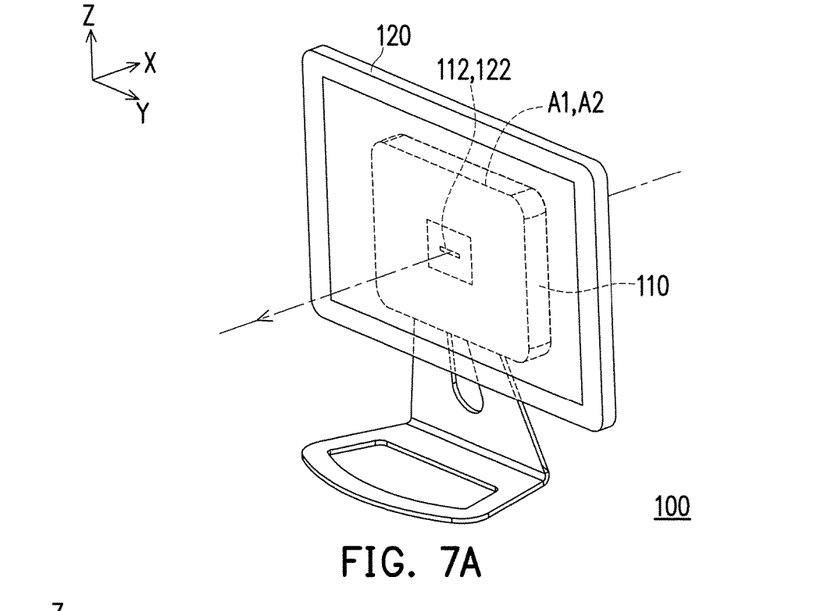
FIG. 7A to FIG. 7G are schematic views of a process of changing an angle of the display unit relative to the host unit according to another embodiment of the invention.
Figure 7B:
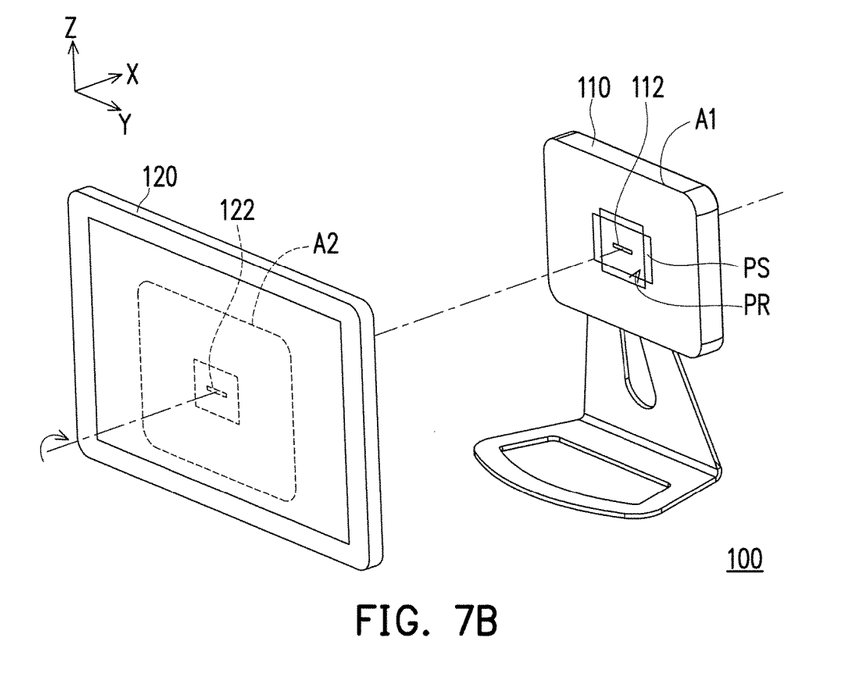
Figure 7C:
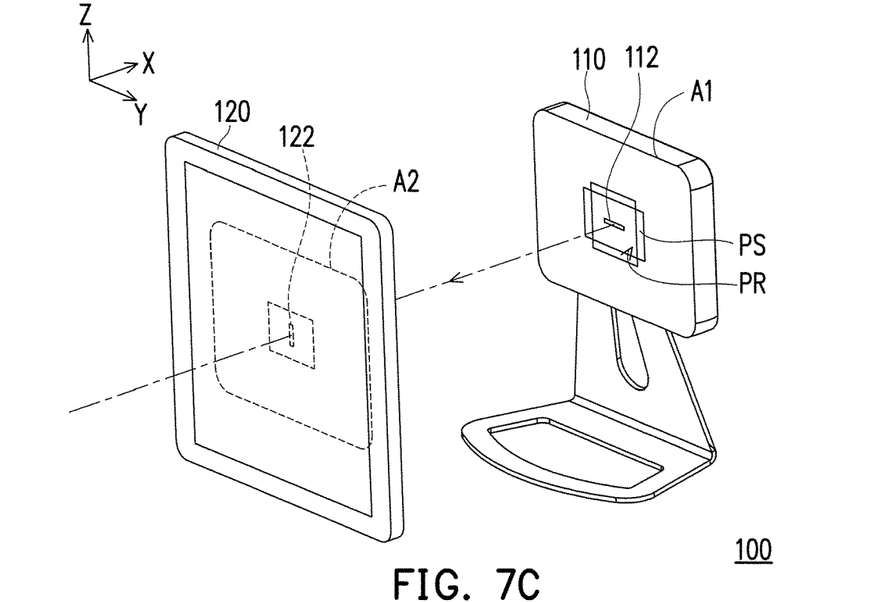

In particular, the user may change an angle of the display unit 120 relative to the host unit 110 according to user requirements. In the embodiment, the display unit 120 being rotated relative to the host unit 110 may be described in the following schematic process diagrams. First, referring to FIG. 7A and FIG. 7B, after unlocking the locking element 140 locking the host unit 110 to the display unit 120, the display unit 120 (along with the outer casing) and the host unit 110 (along with the outer casing) are separated from each other in opposite directions along the first axis X (separated as shown in FIG. 7B). Next, referring to FIG. 7B and FIG. 7C, the display unit 120 is rotated an angle, for example 90 degrees (after rotation as shown in FIG. 7C) relative to the host unit 110. For example, a long side of the display unit 120 was originally parallel to the second axis Y, and after being rotated, the long side of the display unit 120 is, for example, parallel to the third axis Z. In addition, the display connector 122 is also rotated 90 degrees with the display unit 120 relative to the host unit 110.

Figure 7D:
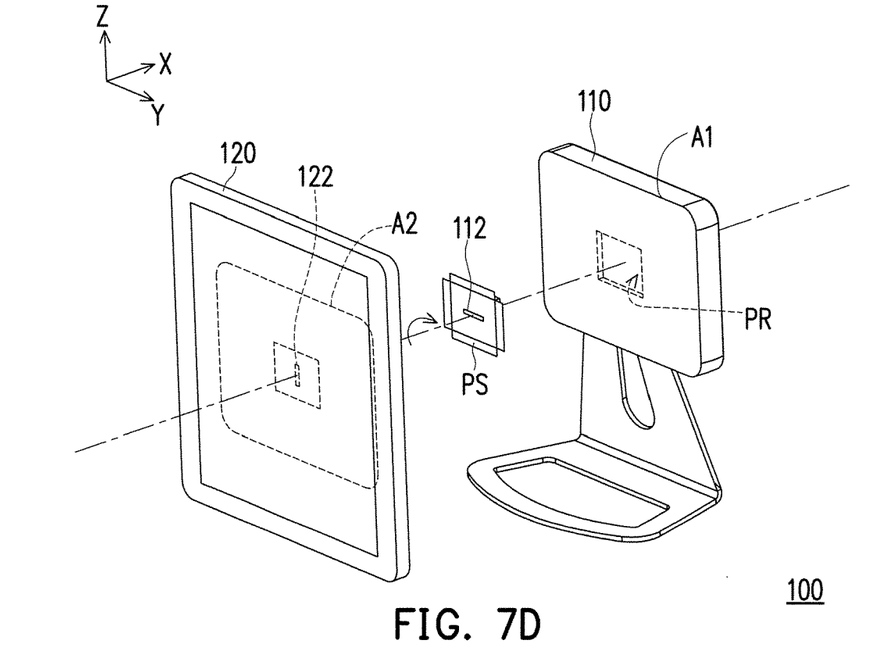

Next, referring to FIG. 7C and FIG. 7D, the position frame PS (along with the host connector 112) is removed from the position concave portion PR in an opposite direction along the first axis X (removed as shown in FIG. 7D). Prior the position frame PS being removed from the position concave portion PR, the position frame PS is disposed in the position concave portion PR in a first position, and the host connector 112 has a first angle corresponding to the first position relative to the host unit 110. The first angle is, for example, 0 degrees (i.e. the host connector 112 has not been rotated yet).

Figure 7E:
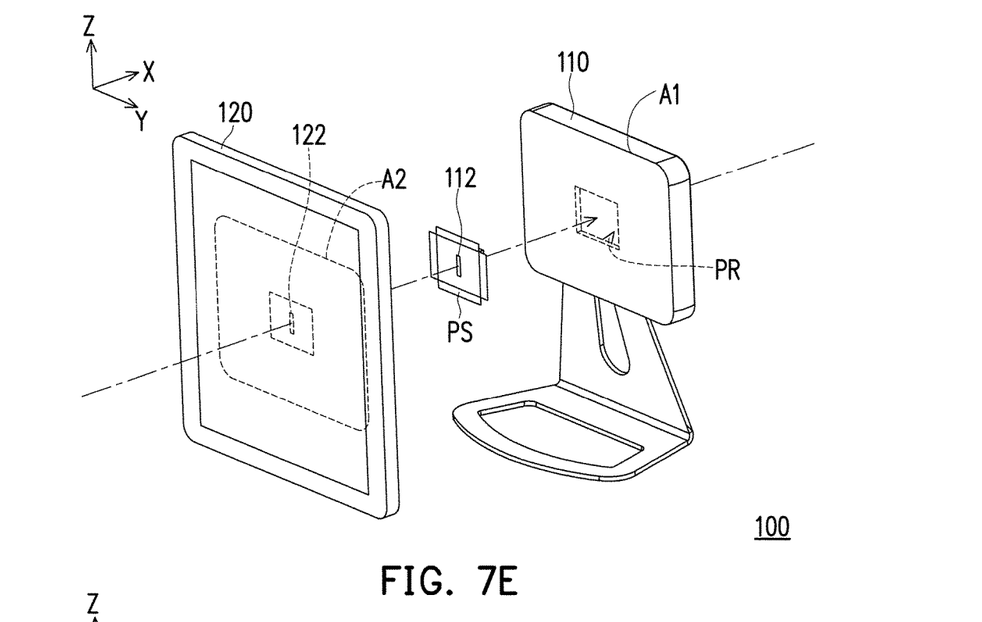
Figure 7F:
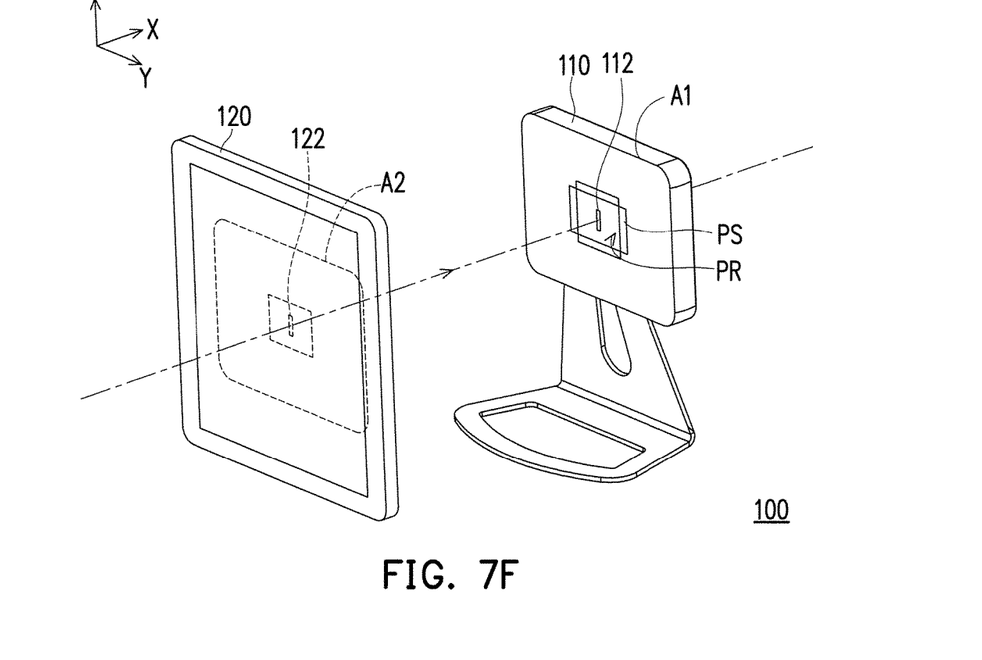
Figure 7G:
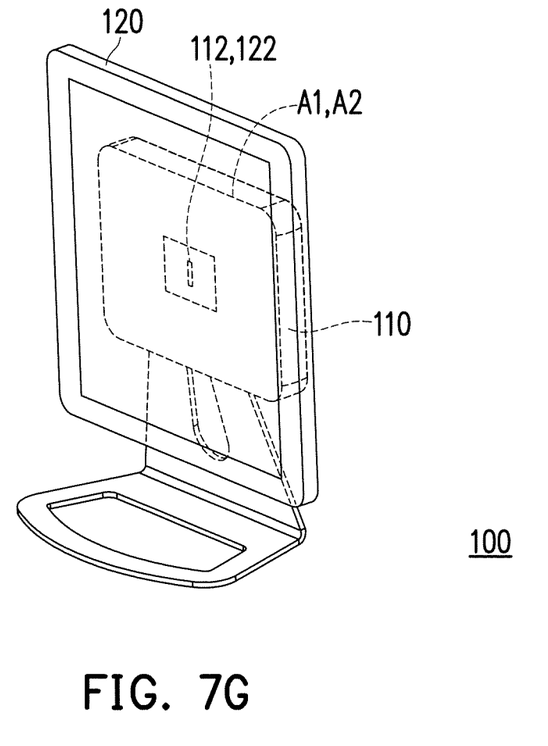

Next, referring to FIG. 7D and FIG. 7E, the position frame PS is rotated an angle, for example 90 degrees (as shown in FIG. 7E). Next, referring to FIG. 7E and FIG. 7F, the position frame PS is disposed in the position concave portion PR in a direction along the first axis X. Since the shape of the position concave portion PR and the shape of the concave of the position frame PS are both regular polygons with four sides, thus when the position frame PS is rotated 90 degrees, the position frame PS is still able to be successfully disposed in the position concave portion PR (as seen in FIG. 7F). At this point, the position frame PS is disposed in the position concave portion PR in a second position, and the host connector 112 has a second angle corresponding to the second position relative to the host unit 110. The second angle is, for example 90 degrees (the host connector 112 is rotated 90 degrees relative to the host unit 110). Next, referring to FIG. 7F and FIG. 7G, the display unit 120 moves in a direction along the first axis X, so that the display connector 122 is connected again with the host connector 112, and the display unit 120 is connected with the host unit 110 again (shown in FIG. 7G). In particular, an angle of the display unit 120 relative to the host unit 110 is changed to an angle of 90 degrees. In addition, since the display connector 122 is rotated 90 degrees because the display unit 120 is rotated relative to the host unit 110, thus, the display connector 122 and the host connector 112 may still successfully connect, so that the display unit 120 and the host unit 110 maintain and electrical connection.

In other embodiments, the shapes of the host bonding area A1 and the display bonding area A2 may be other regular polygons with regular polygons with an even number of sides, circles, or other shapes. Since the shape of the position concave portion PR and the shape of the concave of the position frame PS correspond to the shape of the host bonding area A1, thus when the position frame PS is rotated an angle, the position frame PS may still be successfully disposed in the position concave portion PR. In addition, in these embodiments, suitable shapes may be adapted for the host bonding area A1 and the display bonding area A2, so that the display unit 120 may be rotated other angles relative to the host unit 110, the invention is not limited thereto. Furthermore, in these embodiments, the shape of the position concave portion PR and the shape of the position frame PS may be shapes that do not correspond with the shape of the host bonding area A1. However, in the embodiments, the shape of the position concave portion PR and the shape of the concave of the position frame PS may be regular polygons with regular polygons with an even number of sides, circles, or other shapes, so that when the position frame PS is rotated an angle, the position frame PS still is successfully disposed in the position concave portion PR. To be specific, in the embodiments, through the above methods, the display unit 120 may be rotated relative to the host unit 110. For example, the user may rotate the display unit 120 in 90 degrees with respect to the host unit 110 according to user requirements, so that the originally horizontal display unit 120 is changed to vertical. Thus, the computer apparatus 100 has many applications.

Furthermore, in other embodiments, the display unit 120 may have a position frame and a position concave portion, and the display connector 122 is disposed on the position frame. In the embodiment, the position frame and the position concave portion of the display unit 120 is similar to the position frame PS and the position concave portion PR of FIG. 3 and FIG. 4. In addition, the position frame of the display unit 120 may correspond with the position concave portion of the display unit 120 to be at a first position or a second position. This way, an angle of the display connector 122 relative to the display unit is changed from a first angle corresponding to the first position to a second angle corresponding to the second position. In detail, the display connector 122 of the embodiments may use similar methods to the host connector 112 in FIG. 7A to FIG. 7G, so that when the display unit 120 is rotated an angle relative to the host unit 110, the host connector 112 is still connected with the display connector 122, so that the display unit 120 and the host unit 110 are electrically connected.

To sum up, the embodiments of the invention have at least one of the following advantages or effects. In the computer apparatus of the embodiment of the invention, the display bonding area may be positioned to the host bonding area, and the display connector is coupled to the host connector. In addition, the display unit is detachably connected to the host unit. Thus, when the display unit or the host unit is damaged, the display unit or the host unit may be individually changed, so that the computer apparatus with an AIO framework may undergo maintenance conveniently. In addition, the user may individually select the display unit or the host unit to undergo an upgrade or change according to user requirements. The entire computer apparatus does not need to be changed or upgraded. Thus, the computer apparatus with an AIO framework is easy to upgrade and customize its hardware. Furthermore, in an embodiment of the invention, the display unit of the computer apparatus may be rotated an angle relative to the host unit, so that the computer apparatus may have multiple applications.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:
1. A computer apparatus comprising:
a host unit, having a host bonding area and a host connector, and the host connector being located in the host bonding area; and
a display unit, having a display bonding area and a display connector, and the display connector being located in the display bonding area, wherein the display bonding area is adapted to position to the host bonding area, and the display connector is adapted to couple to the host connector, wherein the display unit is detachably connected to the host unit,
wherein the host unit has a position frame and a position concave portion, the host connector is disposed on the position frame, the position frame has a fitting portion, the shape of the fitting portion corresponds to the shape of the position concave portion, the position frame corresponds to the position concave portion to be rotated from a first position to a second position, and an angle of the host connector relative to the host unit is changed from a first angle corresponding to the first position to a second angle corresponding to the second position, and the first angle is different from the second angle.
2. The computer apparatus as claimed in claim 1, further comprising:

at least one locking element, for locking the host unit to the display unit when the display bonding area is positioned to the host bonding area and the display connector is coupled to the host connector.

3. The computer apparatus as claimed in claim 1, wherein the host unit has at least one host guide portion, the display unit has at least one display guide portion, and the at least one display guide portion and the at least one host guide portion correspond to each other.

4. The computer apparatus as claimed in claim 1, further comprising:
a support unit, connected to the host unit, to support the host unit and the display unit detachably connected to the host unit.

5. The computer apparatus as claimed in claim 1, wherein the shapes of the host bonding area and the display bonding area are regular polygons with an even number of sides.

6. The computer apparatus as claimed in claim 1, wherein the display unit has a display image area, the display image area faces away from the display bonding area, and the display image area is parallel to the display bonding area.

7. A computer apparatus comprising:
a host unit, having a host bonding area and a host connector, and the host connector being located in the host bonding area; and
a display unit, having a display bonding area and a display connector, and the display connector being located in the display bonding area, wherein the display bonding area is adapted to position to the host bonding area, and the display connector is adapted to couple to the host connector, wherein the display unit is detachably connected to the host unit,
wherein the host unit has at least one host guide portion, the display unit has at least one display guide portion, and the at least one display guide portion and the at least one host guide portion correspond to each other, and the at least one host guide portion comprises a guide pillar and an elastic element, the elastic element is disposed between the guide pillar and the host unit, and the at least one display guide portion is a guide opening.

8. A computer apparatus comprising:
a host unit, having a host bonding area and a host connector, and the host connector being located in the host bonding area; and
a display unit, having a display bonding area and a display connector, and the display connector being located in the display bonding area, wherein the display bonding area is adapted to position to the host bonding area, and the display connector is adapted to couple to the host connector, wherein the display unit is detachably connected to the host unit,
wherein the display unit has a position frame and a position concave portion, the display connector is disposed on the position frame, the position frame has a fitting portion, the shape of the fitting portion corresponds to the shape of the position concave portion, the position frame corresponds to the position concave portion to be rotated from a first position to a second position, and an angle of the display connector relative to the display unit is changed from a first angle corresponding to the first position to a second angle corresponding to the second position, and the first angle is different from the second angle.

* * * * *